UNITED STATES PATENT OFFICE.

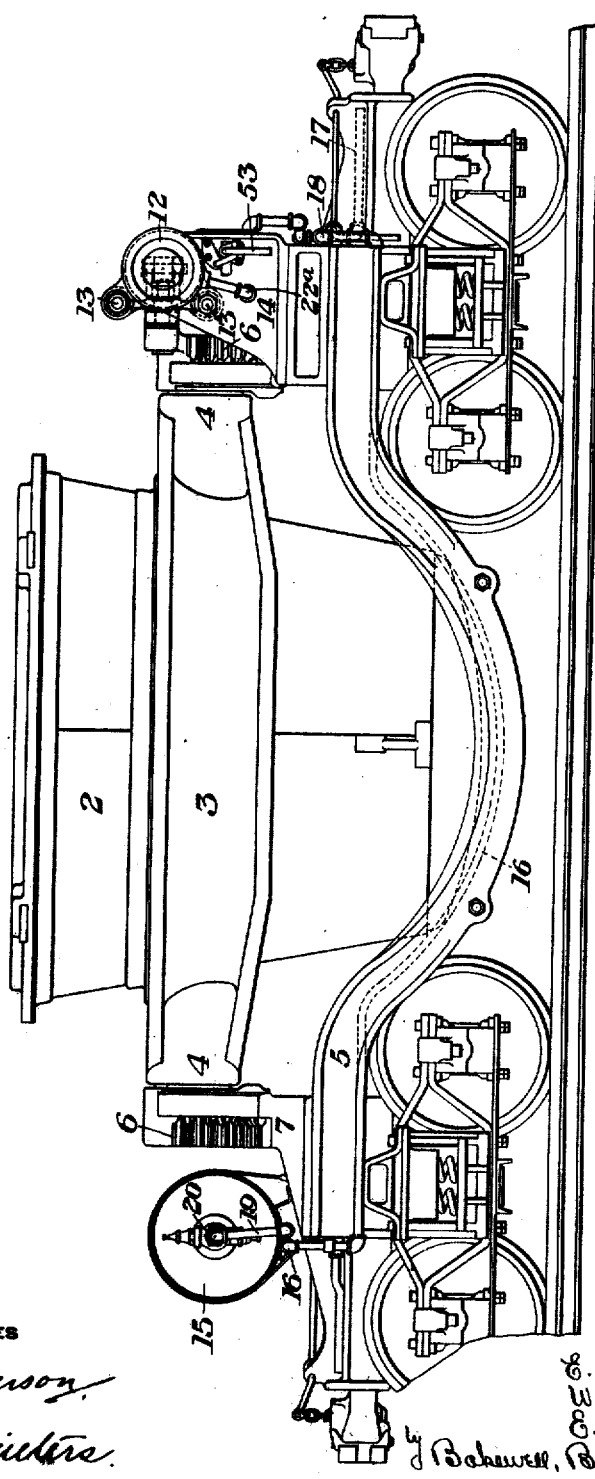

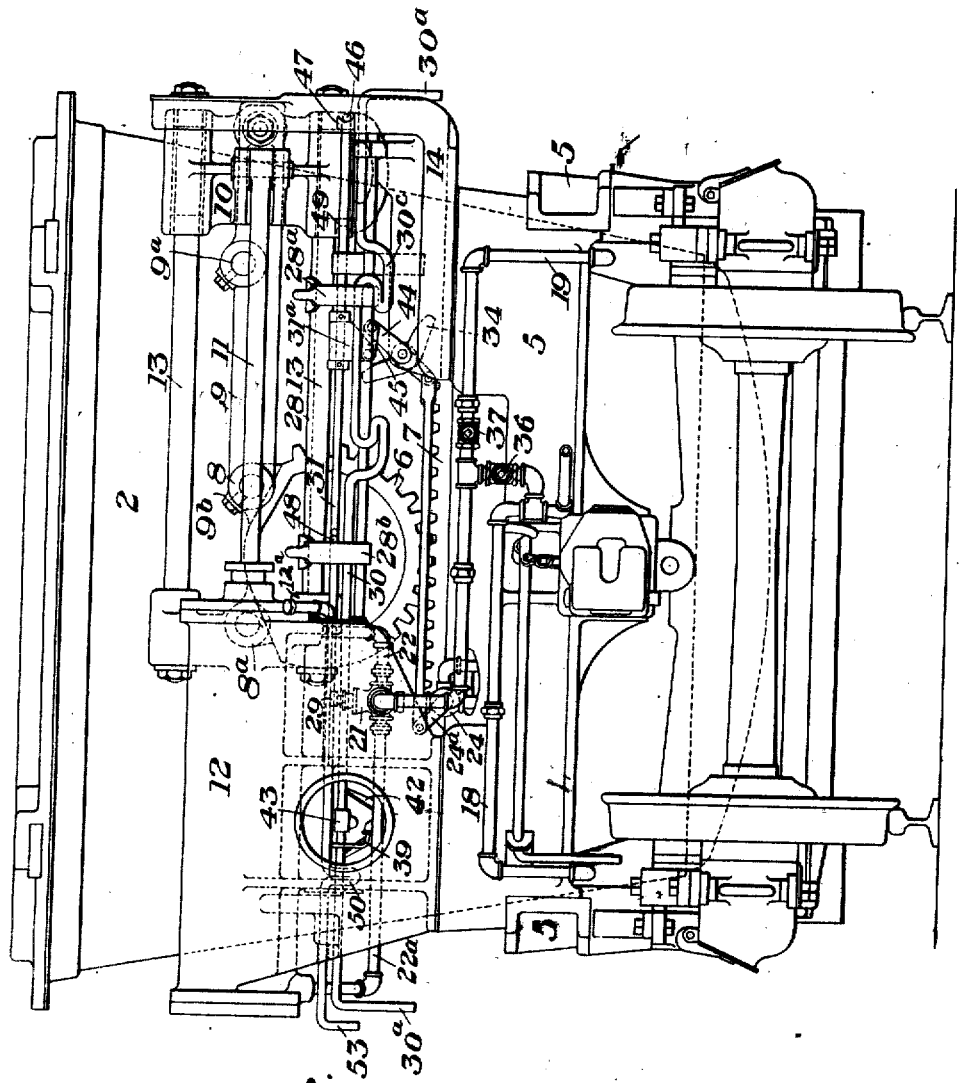

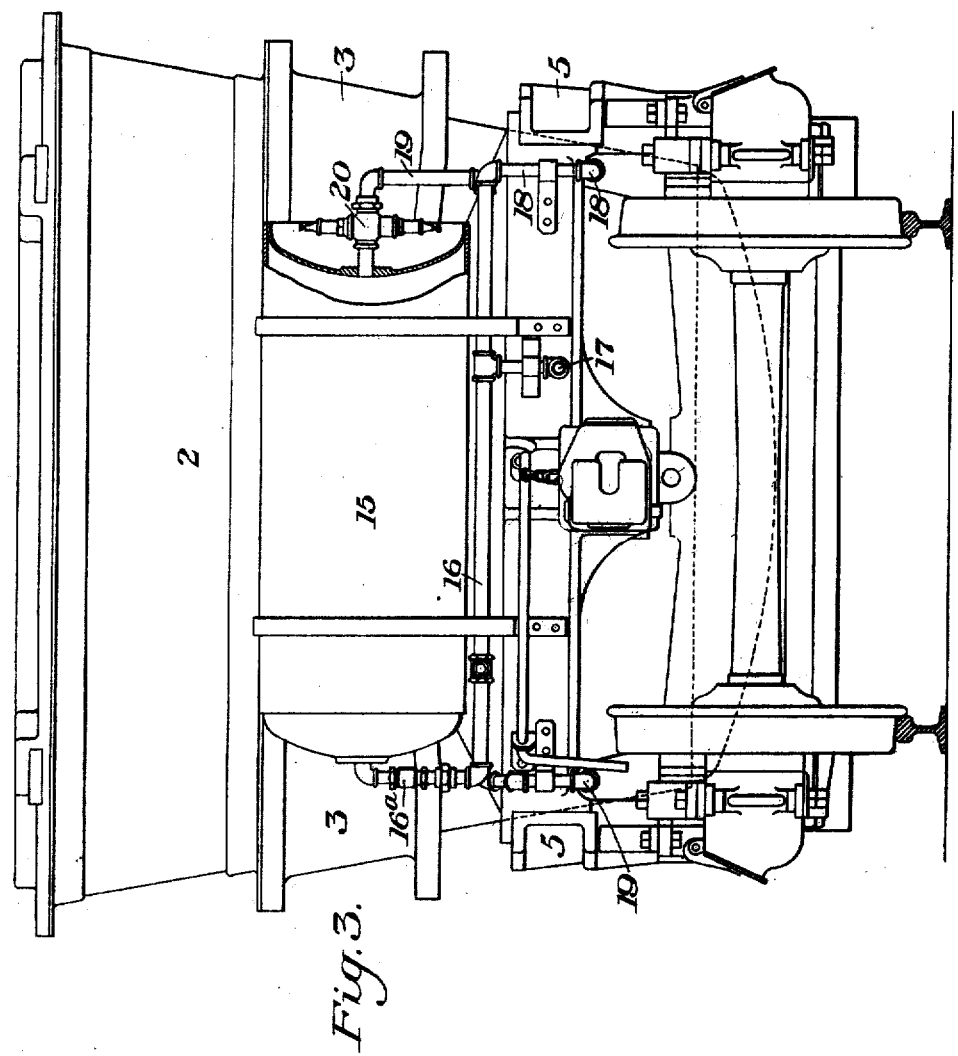

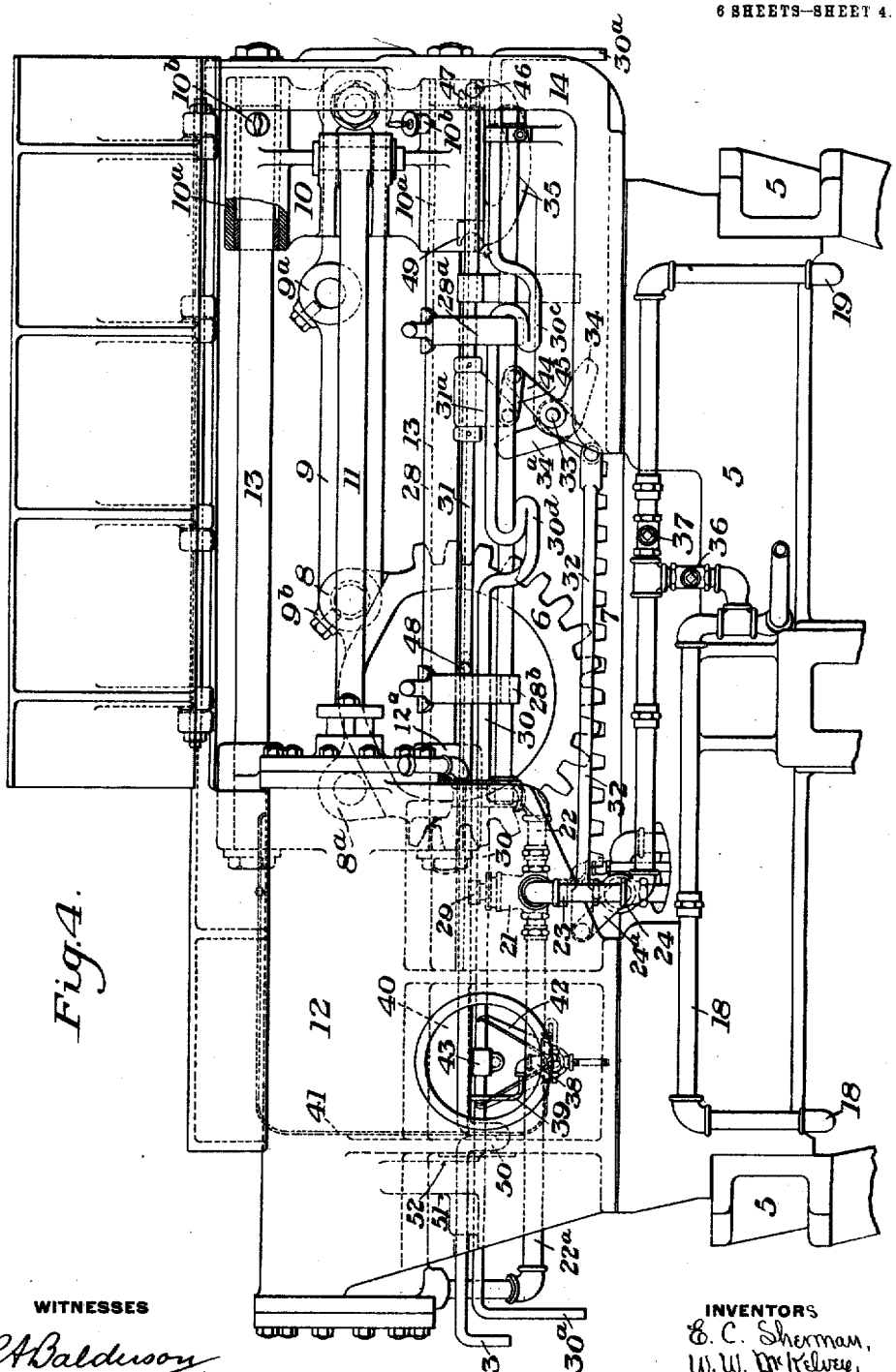

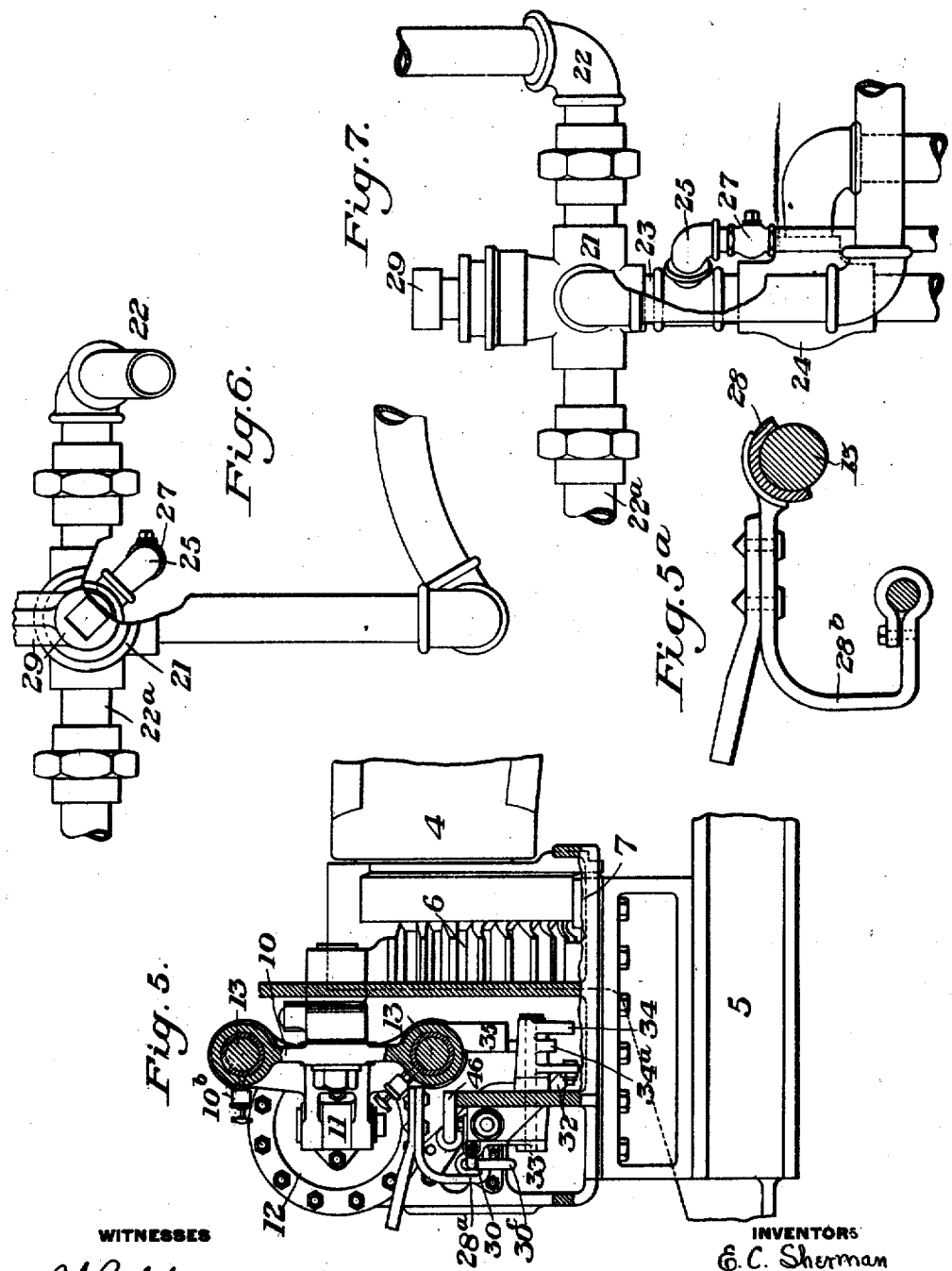

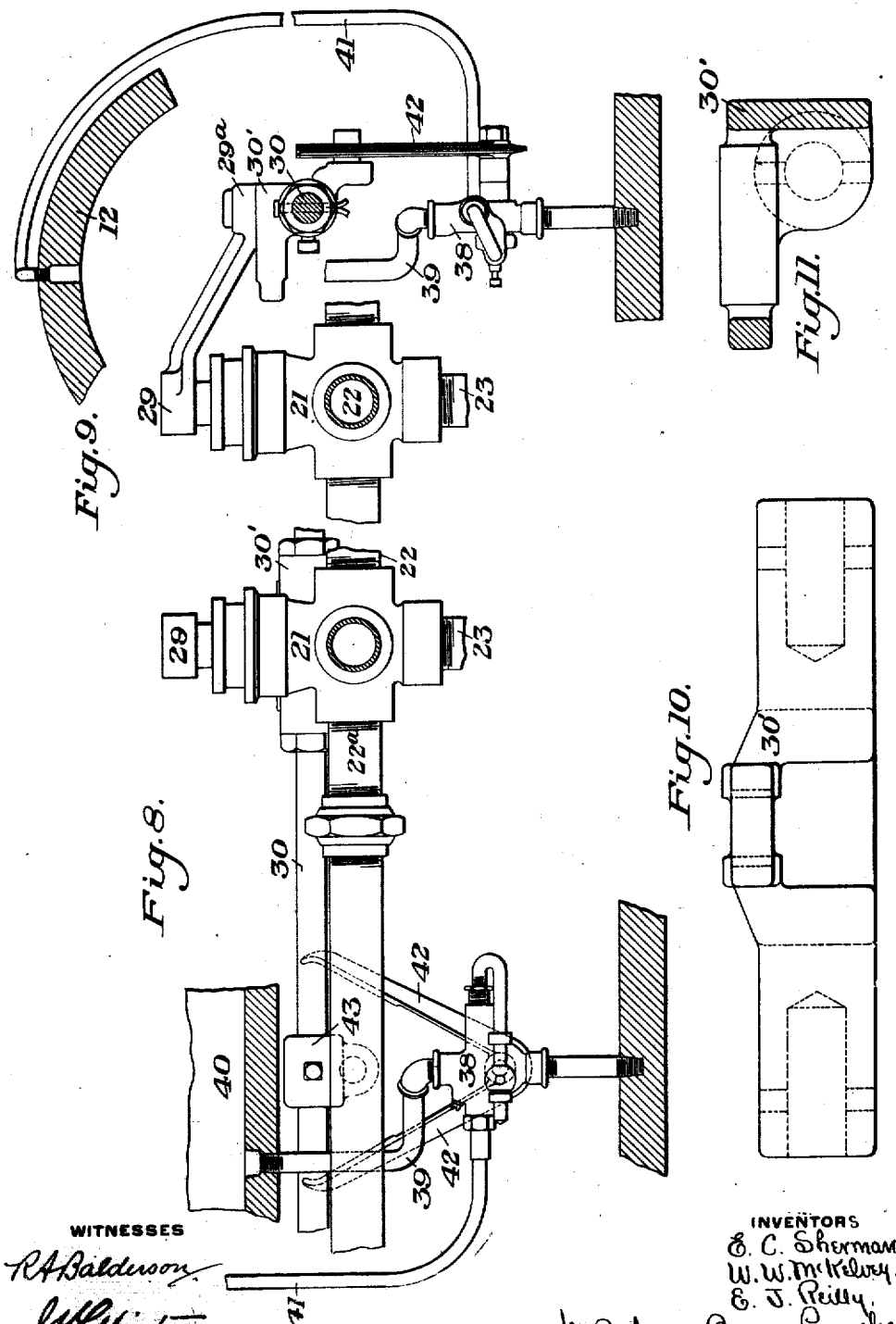

ERWIN C. SHERMAN, WILLIAM W. McKELVEY, AND EDGAR J. REILLY, OF YOUNGSTOWN, OHIO, ASSIGNORS TO THE WILLIAM B. POLLOCK COMPANY, OF YOUNGSTOWN, OHIO, A CORPORATION OF OHIO.

DUMPING-CAR.

1,014,612.   Specification of Letters Patent.   Patented Jan. 9, 1912.

Application filed April 15, 1909. Serial No. 490,153.

*To all whom it may concern:*

Be it known that we, ERWIN C. SHERMAN, WILLIAM W. McKELVEY, and EDGAR J. REILLY, all of Youngstown, Mahoning county, Ohio, have invented a new and useful Improvement in Dumping-Cars, of which the following is a full, clear, and exact description, reference being had to the accompanying drawings, forming part of this specification, in which—

Figure 1 is a longitudinal side elevation of a dumping ladle car constructed in accordance with our invention; Fig. 2 is an end elevation of the same showing the dumping motor end of the car; Fig. 3 is a view similar to Fig. 2 showing the rear end of the car; Fig. 4 is a detail elevation of the dumping-motor operating mechanism on a larger scale; Fig. 5 is a detail sectional elevation showing the cross-head, the cross-head slides and connecting mechanism, and showing the motor-operating mechanism; Fig. 5ª is a detail sectional view showing the ladle locking mechanism; Fig. 6 is a plan; and Fig. 7 is an elevation showing details of the arrangement of the piping and motor operating valves; Fig. 8 is a detail side elevation and Fig. 9 a sectional end elevation showing a portion of the piping to the dumping motor, the valve for the motor and the valve operating lever and showing the oil pump for supplying lubricant to the motor cylinder, and the pump actuating connections to the valve operating lever by which the pump is actuated; Figs. 10 and 11 are detail views of the connection between the valve operating hand lever and the operating valve for the dumping motor.

Our invention relates to dumping cars, more particularly dumping ladle cars employed in handling and transporting molten materials such as iron or blast furnace slag or cinder and which are tipped or tilted when being emptied of their contents.

The main object of our invention is to provide an improved operation and control of the movement in dumping. By the use of our invention a slow dumping movement may be imparted to the ladle through a part of the movement; and then a faster movement may be imparted to dislodge the scull by striking the ladle forcibly on the frame of the car at the end of the stroke.

The apparatus may also be adjusted so as to give a fast movement through the entire dumping operation, where it is desired to give a stronger blow for dislodging sculls. By the same apparatus the dumping movement may be made fast throughout the dumping and return movements.

Another feature of our invention provides for carrying out any of these operations while dumping the ladle in either direction.

Another important feature of our invention is the provision of a reservoir which may be supplied with fluid under pressure; and by which the dumping operation may be carried out irrespective of the position of the locomotive or other source of power.

A further feature of the invention lies in an improved lubricating system.

In the drawings, 2 represents the ladle or cinder pot of a cinder car secured in place in the trunnion ring 3 forming part of the trunnions 4, 4 by which the ladle is mounted upon the frame 5 of the car. The trunnions 4 are each provided with a trunnion gear 6 having teeth meshing with similar gear teeth on the trunnion gear racks 7, 7, forming the trunnion supports which are secured to and form part of the car body 5.

One of the trunnion gears 6 is provided with ears or lugs 8, 8ª to one or the other of which the link 9 is detachably secured in tipping the ladle in opposite directions. The other end of the link 9 is secured to the cross-head 10 which is secured to and is moved by the reciprocating piston rod 11 in the dumping motor cylinder 12. The cross-head 10 is mounted upon suitable longitudinally extending ways or slides 13, one end of these slides being secured to the bosses or lugs located on the motor cylinder 12, the opposite ends being attached to the guide support 14 forming part of the car frame 5.

The openings in the cross-heads 10 through which the slides 13 extend are each provided with a recessed portion 10ª which forms a grease pocket, grease or other lubricant being supplied to these pockets through the grease cups 10ᵇ provided on the cross-head for that purpose.

A reservoir or tank 15 is provided for storing a supply of fluid pressure on each car, being shown as mounted upon the rear end of the car and this tank is connected by means of the pipe 16 with the train supply pipe 17, the adjoining ends of the pipes 17 on adjacent cars being detachably connected together by means of any desirable flexible connection. The supply pipe 17 is also connected by the pipe 18 with the motor cylinder 12, in this way forming a by-pass around the storage tank 15 and permitting the motor cylinders 12 to be directly connected with the fluid pressure supply from the locomotive and enabling the car to be dumped not only by fluid pressure from the reservoir 15 but also by either air or steam supplied direct from the locomotive or any other source. The check valve 16$^a$ on this pipe 16 permits of a free passage of fluid pressure into the tank and prevents the escape of pressure backwardly through the supply pipe when the cars are disconnected from each other. The tank 15 is also connected by the pipe 19 through the reducing valve 20 with the operating valve 21, by which the dumping motor 12 is operated and motor supply pipes 22 and 22$^a$ lead from the operating valve 21 to the ports located on the opposite ends of the dumping motor cylinder 12. The operating valve 21 is provided with an exhaust outlet 23 having a valve 24 by which the exhaust may be opened or closed. The pipe 23 has a by-pass pipe 25 around the valve 24, said pipe 25 being connected to the pipe 23 between the valves 21 and 24. 27 is a valve on the by-pass pipe. The valve 24 is adapted to be entirely closed, so as to prevent the exhaust from the cylinders passing through it. The valve 27 may be set in a partly open position so as to regulate the flow of the exhaust and make the dumping operation as slow as is desired. The speed of the dumping operation is controlled by means of the unbalanced pressure on the supply and exhaust ends of the dumping motor. When a faster or slower dumping movement is desired, the valve 27 is opened to a greater or less extent, in this way increasing or decreasing the speed of the dumping operation in any desired degree.

The dumping motor is provided with a hinged lock 28, by means of which the car body is secured in its vertically upright position, this locking device being employed while the car is being transported from place to place upon the rails of the railway tracks. The ends of the lock 28, by engagement with one of the opposite ends of the cross-head 10 and with the contacting lug 12$^a$ on the end of the motor cylinder 12 or the guide support 14, securely locks the car body in its upright position when either of the eyes 9$^a$, or of the link 9 is secured to the ears 8$^a$ or 8 on the trunnion gear.

The motor operating valve 21 is provided with an operating lever 29, the end 29$^a$ of this lever being connected to the slotted cross-head 30' forming part of the operating rod 30, which extends across the width of the car and which is provided with a bent portion 30$^a$ on each end by means of which it is manipulated by the operator.

The operating rod 30 is arranged so as to be moved by a push from the opposite side of the car to that on which the car empties in being dumped, and the motor is arranged to dump the car counter-clockwise when the link 9 is connected to the trunnion gear 6, as is shown in the drawings and to dump the car clockwise when the ear 9$^a$ on the link 9 is connected to the ear 8$^a$ on the trunnion gear 6. When the car is arranged as shown in the drawings so as to be dumped counter-clockwise, the lock 28 when in its operative position is in that shown, one end of this lock contacting with the lug on the end of the motor 12, the other end engaging with the end of the cross-head 10 so as to hold and secure the car in its upright position. In order to insure that the car will be dumped in the proper direction, the valve 21 may be arranged so that the valve lever must be moved in the same direction as that in which the ladle or pot is to be dumped.

In order to insure the filling of the exhaust end of the motive cylinder prior to the dumping operation, we interlock the operating rod with the locking device in such a way that the locking device cannot be thrown out of its operative position until the operating rod has been so moved as to insure such operation of the valve as to fill the other end of the cylinder. It will be understood that in introducing this preliminary supply of fluid pressure, it is always fed to the port on that end of the cylinder to which the piston travels during the dumping operation. For this purpose we provide the operating rod with the hooks 30$^c$ and 30$^d$, which are arranged to engage the brackets 28$^a$ and 28$^b$ forming a part of the lock 28. With the parts in the position shown in Fig. 4, in which the dumping operation will be counter-clockwise, the lock 28 cannot be released until the operating rod is moved to pull the lip 30$^c$ out of engagement with the bracket 28$^a$ of the locking device. In the act of thus moving the lip out of engagement with the bracket the operator necessarily admits air to the left-hand end of the cylinder.

When the pot or ladle is to be tilted in the other or clockwise direction, the bracket 28$^b$ will be similarly engaged by the lip 30$^d$ on the operating rod, which performs the same functions as those above described.

In the operation of dumping cars, the ladle is preferably moved slowly for a part of the operation, and the speed of dumping is then increased until the ladle is moving much faster at the end of its tipping movement. This is of particular value in dumping ladle cars used in handling molten materials such as blast furnace cinder, as by the slow tipping movement at the beginning of the operation, splashing of the contents is prevented, while by increasing the speed, the time necessary to empty the ladle is very materially lessened. Owing to the faster dumping movement, the ladle, which strikes against the frame 5 of the car, is brought to an abrupt stop which will jar and loosen the scull of solidified cinder formed by the chilling action of the sides of the ladles, and will cause the scull to be discharged from the ladle. In order to obtain this change in the speed of dumping, the valve 24 upon the dumping cylinder is connected by means of a lever arm 24ª and link or rod 32 with the shaft 33, on which the dogs 34, 34ª are mounted. As the car is dumped, the dog 34 or 34ª comes into contact with one side or the other of the projection 35 on the lower end of the moving cross-head 10, and, as the dog is moved by contact with the projection 35, the connecting link 32 and lever 24ª are moved so as to open the valve 24 and the fluid is permitted to escape more rapidly from the exhaust end of the motor 12, in this way giving a more rapid movement as the ladle approaches the end of its dumping motion.

To insure the proper setting of the exhaust valve 24 during the next dumping movement, we preferably provide means for automatically resetting this valve as the cross-head moves back to its normal position during the return of the ladle to its upright position. For this purpose we provide the resetting bar 31, which is actuated by the lever arm 44 projecting from the shaft 33 and having a link connection 45 to a projection 31ª on this bar 31. When with the parts located as shown in the drawings, the ladle moves through its dumping movement, the projection 35 on the lower end of the cross-head will cause this resetting bar to move a certain distance. On the return stroke of the cross-head, a sidewise bent portion 46 at the end of the bar or rod is engaged by a projecting lug 47 on the side of the cross-head, thus resetting the exhaust valve 24 to its closed position.

When the direction of the tilting movement is reversed, by changing the points of connection of the link 9 to the trunnion gear 6, the same operation is obtained by engagement of a similar lug 48 located on another part of the resetting bar with the lug 49 on the cross-head.

When a slow dumping movement is desired throughout the dumping operation, the lever arm 32 is disconnected from its arm on the shaft 33. In such case there is no opening of the exhaust valve 24 and consequently the movement is slower throughout the dumping operation. If a quick motion is desired throughout the dumping operation, the resetting bar is turned on its own axis so as to bring its bent portions 46 or 48 out of line of movement of the engaging projection 47 or 49 on the cross-head. The arrangement is such that the exhaust valve must be opened before the resetting bar can be rotated. This is accomplished by providing a bent portion 50 on the resetting bar, which must be brought into a position between two lugs 51, 52 on the cylinder 12 before the bar can be rotated. In bringing this bent portion into this position, the exhaust valve 24 is necessarily opened. The resetting bar 31 is rotated by the operator by means of the bent portion 46 or a correspondingly bent portion 53 on the opposite end of this bar.

The piping for the fluid pressure leading to the motor 12 is provided with suitable cocks 36 and 37, by means of which the supply pipe from the locomotive or the supply pipe from the reservoir on the end of each car, is connected to or is shut off from the motor 12, in this way permitting of the car being dumped by fluid pressure contained in the reservoir; by air pressure supplied direct from the air pump on the locomotive or other source, or by means of steam pressure supplied direct by the locomotive or other source.

In order to properly lubricate the motor cylinder 12 and insure that the lubricant is regularly supplied, a small pump 38 is mounted on the motor end of the car and the pump cylinder is connected by the supply pipe 39 with an oil reservoir 40, and by the pipe 41 with the interior of the motor cylinder. The piston of the pump is operatively connected by the yoke 42 with the projection 43 on the operating lever 30 and in this way, each time the lever 30 is actuated to cause the car to be dumped, the oil pump is actuated to force a supply of lubricant from the tank 40 into the motor cylinder 12. The pump 38 may be operated independently of the operating rod which controls the dumping movement.

The advantages of our invention are many, and will be appreciated by those skilled in the art.

By providing a storage tank or reservoir on each car, in which a supply of fluid pressure is maintained, we are enabled to dump the cars when the cars are disconnected from each other or when located at points remote to one another, and to dump the cars without connection to an external source of supply. The capacity of the air pump on locomotives is relatively small, and where a number of cars which comprises the train load are to be dumped by pressure supplied by the locomotive, the locomotive is enabled to fill all of the storage tanks or reservoirs and supply sufficient air to dump all of these cars simultaneously, as by providing an independent storage tank on each car all of the separate tanks may be filled to their capacity by the locomotive while the train is being hauled over the tracks between the point or points at which they are loaded and the point of dumping. The cars can then be dumped after the locomotive is disconnected from the train and has been removed from the point of dumping. By providing the storage tank on each car, and providing the separate pipe lines and valves to the tank and to the motor from the locomotive the cars may be dumped by fluid pressure in the tank or by fluid pressure supplied direct from the locomotive or other source. The pressure regulating valve upon each storage reservoir prevents waste of the fluid pressure and enables the fluid to be used at any desired pressure.

The system for controlling the speed of dumping is simple and efficient, and avoids any liability of leaving the exhaust valve open when it is desired to give a slow movement through a part of the dumping operation.

Modifications in the construction and arrangement of the parts may be made without departing from our invention.

The car body may rotate about a fixed axis instead of rolling or rocking as shown in the drawings, and the term dumping car as used in the claims is intended to cover broadly all types of rocking, rolling and tilting cars.

We claim:—

1. A dumping car, a motor geared to said car, to effect the dumping movements thereof, and a controller for the motor arranged to increase the speed of the dumping movement during the last portion of such movement, substantially as described.

2. A dumping car, a fluid pressure motor geared to the car to effect the dumping movements thereof, a source of fluid pressure supply for the motor, and valve means for controlling the operation of the motor to dump the car at an increasing velocity during the last portion of such movement, substantially as described.

3. A dumping car, a fluid pressure motor geared thereto to effect the dumping movements, means for supplying fluid pressure to the motor, valve means for controlling the operation of the motor and means for actuating said valve to vary the speed of the dumping movement during different portions thereof, and to increase the speed during the last portion of such movement substantially as described.

4. A dumping car, a fluid pressure motor geared thereto to effect the dumping movements, means for supplying fluid pressure to the motor, a valve controlling the exhaust of the motor, and means for actuating said valve to gradually increase the speed of the dumping movement, substantially as described.

5. A dumping car, a fluid pressure motor geared thereto to effect the dumping movements, means for supplying fluid pressure to the motor, a valve controlling the exhaust of the motor, and a connection operated by the motor for actuating the said valve to increase the speed of the dumping movement toward the end of such movement, substantially as described.

6. A dumping car, a fluid pressure motor geared thereto to effect the dumping movements, means for supplying fluid pressure to the motor, a valve controlling the exhaust of the motor, and a connection actuated by said motor for actuating the valve during the dumping and the return movements of the car, to increase the speed of the dumping movement toward the end thereof and to provide for an increase in the speed of the return movement, substantially as described.

7. In a dumping car having a fluid pressure actuated dumping motor, means for supplying fluid pressure to said motor, and means for automatically opening the exhaust by the movement of the motor arranged to vary the speed of the dumping operation; substantially as described.

8. In a dumping car having a fluid pressure actuated dumping motor, means for supplying fluid pressure to said motor, and means for automatically controlling the exhaust from the motor, said controlling means being arranged to cause the motor to dump the car at an increasing velocity; substantially as described.

9. In a dumping car having a fluid pressure actuated dumping motor, means for supplying fluid pressure to said motor, and automatic means controlling the motor exhaust arranged to be actuated by the movement of the motor to gradually open the exhaust to dump the car at an increasing speed; substantially as described.

10. In a dumping ladle car having a fluid pressure actuated dumping motor thereon, means for supplying fluid pressure to said motor, means for connecting the motor with the ladle and arranged to be connected to dump the ladle in opposite directions, and automatically operating mechanism actuated by the motor for controlling the rate of exhaust actuating the speed of the motor; substantially as described.

11. In a dumping ladle car having a fluid pressure actuated dumping motor, means for supplying fluid pressure to said motor, a motor cross-head arranged to be connected at two points on the ladle to dump in opposite directions, mechanism actuated by the motor for controlling the motor exhaust to regulate the speed of the dumping operation, said exhaust controlling mechanism having means whereby it is operated when the cross-head is connected to either of said points on the ladle, substantially as described.

12. A dumping ladle car having a ladle dumping motor actuated by fluid pressure, means for supplying pressure to the motor, mechanism for controlling the exhaust from the motor, said controlling mechanism being arranged to increase the speed of dumping as the dumping operation progresses; substantially as described.

13. A dumping car having a fluid pressure motor thereon for dumping, means for supplying fluid pressure to said motor and means actuated by the motor for varying the speed of the dumping operation during the last portion of its dumping movement; substantially as described.

14. A dumping ladle car having a fluid pressure motor thereon for dumping, said motor being adapted to dump in each of opposite directions; a valve controlling the supply of fluid pressure to the motor, and an exhaust valve for gradually varying the speed of the dumping operation; substantially as described.

15. In a dumping ladle car, a ladle dumping motor, means for supplying fluid pressure to the motor, and mechanism for locking the ladle in its upright position on the car, said means being arranged to coact with the locking mechanism so as to supply fluid pressure to the exhaust end of said motor preparatory to the dumping operation; substantially as described.

16. In a dumping ladle car, a ladle dumping motor, means for supplying fluid pressure to the motor, and mechanism for locking the ladle in its upright position on the car, said means being arranged to coact with the locking mechanism so as to supply fluid pressure to the exhaust end of the motor and free the locking mechanism preparatory to the dumping operation; substantially as described.

17. A dumping ladle car having a dumping motor thereon operatively connected to the ladle, means controlling the supply of fluid pressure to the motor inlet, and means controlling the exhaust outlet arranged to be actuated by the motor during the dumping operation and vary the speed of dumping, substantially as described.

18. In a dumping ladle car having a dumping motor thereon operatively connected to the ladle, means controlling the fluid pressure supply to the motor inlet and means controlling the exhaust outlet adapted to be actuated by the motor during the dumping operation and vary the speed of dumping and mechanism arranged to reset the controlling means for the exhaust outlet; substantially as described.

19. In a dumping car, a dumping motor actuated by fluid pressure, a tank on the car for storing pressure for operating the motor, means for conducting fluid pressure from a source of supply to said tank and from there to the motor, another connection with said source of supply leading directly to the motor independently of said tank, and a control valve common to the connections, together with other valves whereby the motor can be operated either by fluid pressure from the tank or direct from the said source, substantially as described.

In testimony whereof, we have hereunto set our hands.

ERWIN C. SHERMAN.
WILLIAM W. McKELVEY.
EDGAR J. REILLY.

Witnesses:
PORTER POLLOCK,
W. G. WILSON.